(12) United States Patent
Eck

(10) Patent No.: US 6,418,787 B1
(45) Date of Patent: Jul. 16, 2002

(54) LEVEL TRANSMITTER FOR A LIQUID CONTAINER AND METHOD FOR DETERMINING THE LEVEL IN A LIQUID CONTAINER

(75) Inventor: Karl Eck, Frankfurt am Main (DE)

(73) Assignee: Mannesmann VDO AG, Frankfurt am Main (DE)

( * ) Notice: Subject to any disclaimer, the term of this patent is extended or adjusted under 35 U.S.C. 154(b) by 0 days.

(21) Appl. No.: 09/615,213

(22) Filed: Jul. 13, 2000

(30) Foreign Application Priority Data

Jul. 15, 1999 (DE) .......................... 199 33 044

(51) Int. Cl.[7] .............................................. G01F 23/00
(52) U.S. Cl. ...................... 73/290 V; 73/290 R; 367/87
(58) Field of Search ........................... 73/290 R, 290 V, 73/628; 324/124; 367/87, 95, 97

(56) References Cited

U.S. PATENT DOCUMENTS

| 3,208,281 A | * | 9/1965 | Kalmus et al. ........... 73/290 V |
|---|---|---|---|
| 3,256,738 A | | 6/1966 | Di Giacomo et al. ........ 73/290 |
| 3,985,030 A | * | 10/1976 | Charlton ................... 73/290 V |
| 5,264,931 A | * | 11/1993 | Pfeiffer ....................... 340/621 |
| 5,814,830 A | * | 9/1998 | Crowne ...................... 250/577 |

FOREIGN PATENT DOCUMENTS

| DE | 40 08 135 | 9/1991 | .......... G01F/23/28 |
|---|---|---|---|
| DE | 198 20 167 | 11/1998 | .......... G01F/23/26 |
| EP | 0 690 293 | 6/1995 | .......... G01F/23/72 |

* cited by examiner

Primary Examiner—Hezron Williams
Assistant Examiner—Katina Wilson
(74) Attorney, Agent, or Firm—Cohen, Pontani, Lieberman & Pavane

(57) ABSTRACT

A level transmitter for a liquid container includes a simple construction without feed lines to the sensors through the container wall. The level transmitter has a plurality of sensors made from magnetostrictive material, which are excited to oscillate by an alternating magnetic field emitted by a transceiver unit. The sensors oscillate at different frequencies which are detected by the transceiver unit. The detected signals are fed to an evaluation unit and used to form a signal for the level. The level transmitter and the method are particularly suitable for use in fuel tanks in motor vehicles.

18 Claims, 2 Drawing Sheets

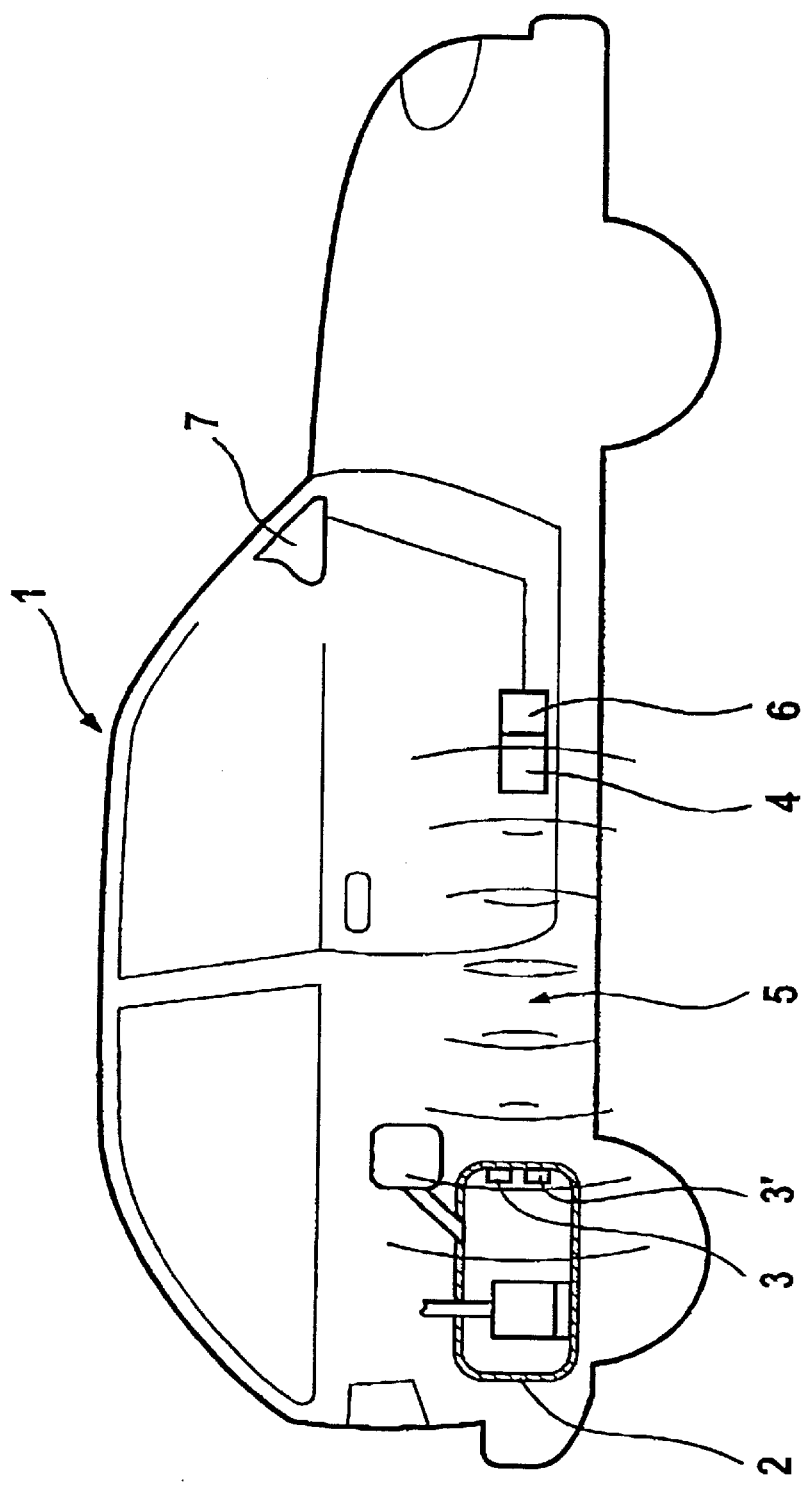

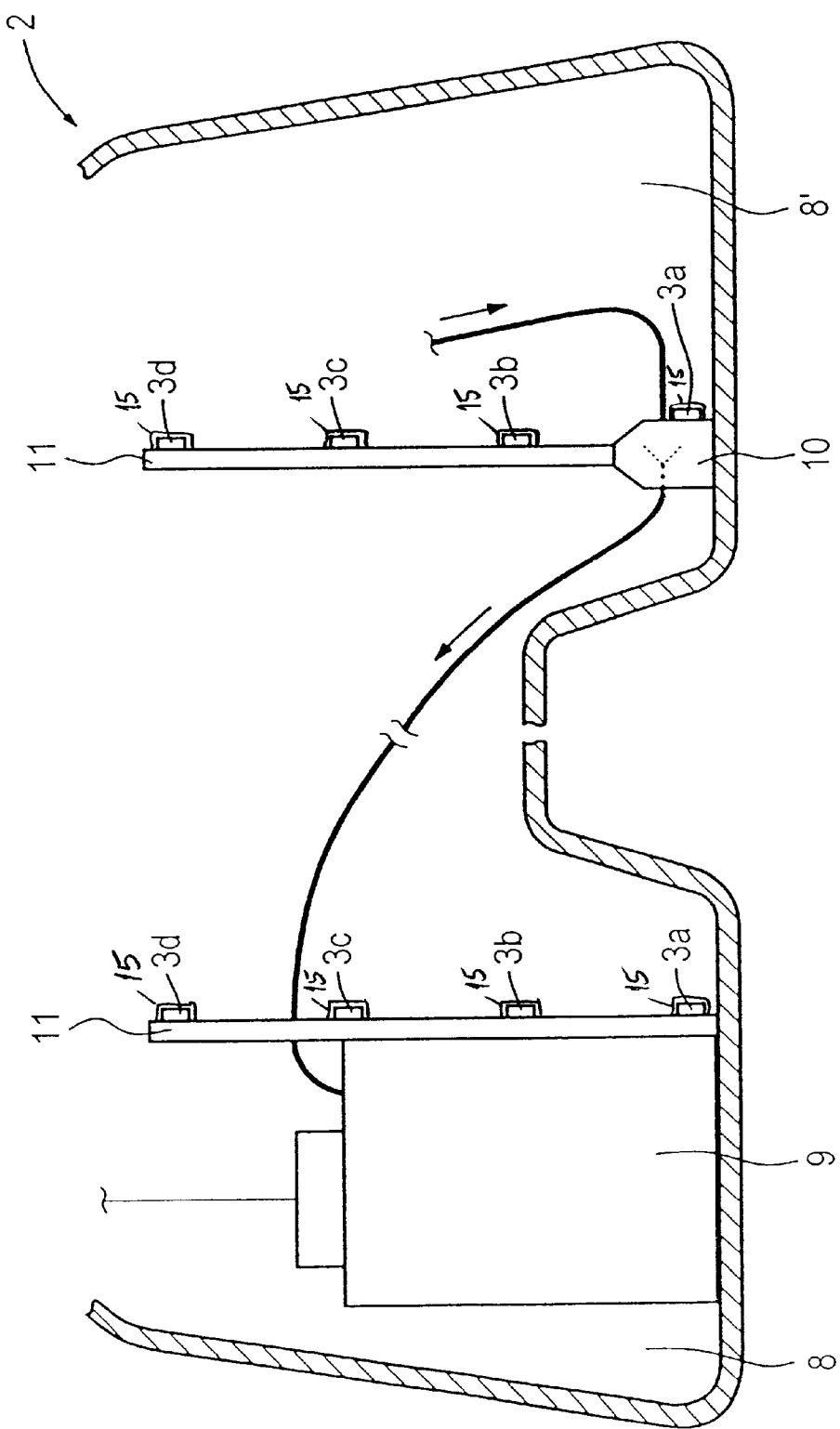

LEVEL TRANSMITTER FOR A LIQUID CONTAINER AND METHOD FOR DETERMINING THE LEVEL IN A LIQUID CONTAINER

BACKGROUND OF THE INVENTION

1. Field of the Invention

The present invention relates to a level transmitter for a liquid container, more specifically a fuel tank in a motor vehicle, having a plurality of sensors and a method for determining the level in the liquid container.

2. Description of the Related Art

Level transmitters for determining levels in liquid containers are much used in practice and are therefore known. Depending on the site of installation of the liquid container, the containers can take the most varied forms. For example, the liquid containers used in motor vehicles such as fuel tanks are adapted very strongly to prescribed spaces. Thus, many of the fuel tanks currently used have two or more chambers. A level transmitter is arranged in each of these chambers to determine a level in the liquid container having more than one chamber. In these cases, the level transmitters comprise float-actuated lever transmitters or transmitters comprising a plurality of sensors.

European Patent reference EP 0 690 293 A2 discloses level transmitters with magnetostrictive sensors for use in aircraft. In each case a level transmitter comprises a tube with a float arranged for vertical movement. A magnet is arranged in this float. Sensors made from magnetostrictive material are fastened in the tube at one end on a strip made from magnetic material. A wire-wound resistor is located at the opposite end of the sensors. If the float passes with the magnet into the region of the sensor, the sensor makes contact with the wire-wound resistor. A measuring unit arranged on the bottom of the fuel tank is used to determine the level in the fuel tank at the site of the respective level transmitter via the magnitude of the measured resistance. These transmitters are expensive because each level transmitter has a plurality of sensors, which are interconnected to form a sensitive measuring arrangement. Furthermore, each of these measuring arrangements must be encapsulated separately. Moreover, each level transmitter requires a float with a magnet, to transmit the liquid level to the sensors. Additional expenditure on assembly results from the fact that the tube must be fastened to the bottom of the fuel tank. Finally, each level transmitter is connected to its own dedicated measuring unit. In addition to the high initial outlay required for installing the multiplicity of level transmitters, there is a rise in the susceptibility to faults of such a system because of the number of components used. A further disadvantage in the use of plural level transmitters in a liquid container is that the useful container volume is reduced to an extent which cannot be neglected.

SUMMARY OF THE INVENTION

It is therefore an object of the present invention to provide a level transmitter and a method for determining the level which overcomes the problems of the prior art. The level transmitter according to the present invention is of a simple design and not susceptible to faults. Moreover, it is not to require any additional protective measures for electric lines or the evaluation unit. The level transmitter according to the present invention is to be capable of universal use, easy to assemble and cost-effective. The arrangement of the level transmitter is intended not to diminish the useful container volume substantially.

The object is achieved by a level transmitter for a liquid container, comprising, a plurality of sensors comprising a magnetostrictive material arranged within a liquid container, a transceiver unit operatively arranged for transmitting an alternating magnetic field and receiving mechanical oscillations produced by the plurality of sensors in response to the alternating magnetic field, said transceiver unit being arranged outside of the liquid container and, an evaluation unit operatively connected to said transceiver unit and arranged for receiving the measured oscillating values from the transceiver unit, wherein a dimension of each of said plural sensors differs from the dimensions of the others of said plural sensors such that each of the plural sensors has its own characteristic oscillatory behavior.

The level transmitter according to the present invention has a plurality of sensors made from a magnetostrictive material, a transmitter unit for transmitting an alternating magnetic field, a receiver unit for receiving mechanical, i.e., ultrasonic, oscillations, and an evaluation unit. The sensors are arranged in the liquid container. All other components of the level transmitter are located outside the liquid container. The transmitter applies the alternating magnetic field to the sensors to determine the level. Each sensor oscillates in response to the alternating magnetic field and the oscillations are detected in turn by the receiver unit. The measured oscillation values are fed thereafter to the evaluation unit. To determine whether the sensor is located in the liquid or in air, use is made of the circumstance that the oscillatory behavior of the sensor in the liquid differs from that in air.

If each of the sensors had the same physical dimensions, they would have the same oscillatory behavior and it would not be possible for the measured values to be assigned to the individual sensors by the evaluation unit. Accordingly, the dimensions of all the sensors differ in such a way that the oscillatory behavior of one sensor differs clearly from the others. By virtue of the fact that the frequency of the alternating magnetic field is adapted to the oscillatory behavior of each sensor, it is possible to measure the oscillatory behavior of each individual sensor. The measured oscillation values are fed to the evaluation unit, where each measured oscillation value is compared with a corresponding desired value, as a result of which the first signal for the level of the respective sensor is formed. After all the sensors have been interrogated, the evaluation unit likewise forms from the first signals a second signal which corresponds to the level in the liquid container.

An advantage of the level transmitter according to the present invention is that only the sensors are arranged in the liquid container. All the other components are located outside the liquid container. Since the sensors are a few square millimeters in size, and no electrical lines are required for making contact or for transmitting measured values to the sensors, the useful container volume is no longer reduced. Moreover, the level transmitter according to the invention comprises a very cost-effective design because one evaluation unit may be used to evaluate each of the sensors.

The fact that most of the components of the level transmitter are arranged outside the liquid container also keeps the cost of assembly particularly low. In some circumstances, the number of necessary separate openings in the liquid container may be economized.

The present invention also relates to a measuring method in which no forces arise, for example, from movements of floats or levers. Consequently, the fastening of the sensors in the liquid container is configured with particular ease. As stated above, the transceiver unit detects measured oscillation values without the use of cables. Accordingly, the site of installation of all the other parts of the level transmitter may be selected freely. This has the advantage, in turn, that the electrical components no longer have to be arranged in regions of danger to them, with the result that the susceptibility to faults is reduced, and the outlay for reliable operation is reduced.

The sensors may be mounted in a particularly simple way when they are fastened onto the container wall. The fastening, for example by bonding on or latching, may comprise any form if it is ensured that the sensors are not restricted in their oscillation. Owing to the arrangement at any desired points in the liquid container, the level may be determined exactly even in liquid containers of complicated shapes.

In a further embodiment, the sensors may be arranged on other built-in components in the liquid container. Thus, the outlay on assembly in the liquid container is eliminated when the sensors are mounted, for example, on the outside of a delivery unit or on a suction jet pump and are subsequently inserted with those components into the liquid container. For the purpose of an easier fastening of the sensors, the sensors may be arranged on a holder such that only the holder is to be fastened on the delivery unit.

The sensors are advantageously arranged in a fashion combined to form measuring points. Thus, the sensors arranged on the delivery unit, for example, form a first measuring point, while the sensors arranged on a suction jet pump form a second measuring point. In addition to these location-dependent measuring points, the sensors may be arranged at level-dependent measuring points. In this case, the sensors respectively form a measuring point at the highest and at the lowest level of the liquid container. Further measuring points may be arranged therebetween, depending on the resolution desired.

When the sensors are used in liquid containers with aggressive media, it is advantageous to cover the sensors with a protective coating, for example a film, it then being necessary to take account of the influence of the coating on the oscillatory behavior of the sensors.

Because the arrangement of the transceiver unit may be freely selected, its arrangement at a central point is particularly favorable for electrical measuring and control devices, since the electrical lines may be of particularly short design, and this leads to saving in weight and costs in addition to the better signal processing. However, it may also be advantageous in this case to arrange a transceiver unit separately in space.

The frequency of the alternating magnetic field is advantageously selected such that the sensors oscillate at resonant frequency. In another refinement of the method, a frequency range in which the resonant frequency of the sensor is situated, and which is traversed at intervals, is selected for each sensor. In this case, the resonant frequencies of the sensors in air or in the liquid may be selected as the resonant frequencies. The frequency, the amplitude and/or the decay time of the oscillation of the sensors are advantageously used in the evaluation unit to form the first signal which corresponds to the level at the sensor. Whether the sensor is situated inside or outside the liquid can be determined very easily by comparing the measured oscillation values with the prescribed values of the sensor stored in the evaluation unit.

The frequency of the alternating magnetic field is preferably selected between 20 and 100 kilohertz. Since levels in liquid containers frequently vary very slowly, in another embodiment of the method according to the present invention, the level is determined not continuously, but at intervals. The intervals may be a few milliseconds to a few minutes, such as, for example 1 millisecond to 10 minutes. Short measuring intervals are particularly advantageous whenever external influences, for example centrifugal forces, lead to falsified measurement results. For this purpose, the signals formed by the evaluation system are not relayed immediately as the level signal, but averaged over time. The signal for the level is subsequently formed from the mean value. Therefore, noise quantities may be effectively eliminated.

It must be ensured for the correct determination of level in the container that a measured oscillation value is also assigned to the correct sensor. In this case, it is of no significance whether the evaluation unit sends the transmitter a signal for the sensor to be interrogated, so that the transmitter thereupon emits the alternating field at the frequency characteristic of the sensor to be interrogated, or whether the sequence of the interrogation sensors in the transmitter and the evaluation unit is performed using a fixed program in a separately stored fashion.

The sequence of the interrogation of the individual sensors is arbitrary, and may be performed as dependent on location and as dependent on level. Particularly in the case of the level-dependent interrogation of measuring points, the outlay on measurement may be minimized by interrogating only the measuring point of interest as a function of the level determined. Thus, in the case of a relatively high level only the measuring points of the high level of the liquid container are interrogated. By analogy therewith, only the measuring points of the lowermost level are interrogated in the case of a low level.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail with the aid of exemplary embodiments. In the associated Figures:

FIG. 1 is a schematic diagram showing the arrangement of the level transmitter according to an embodiment of the present invention in a motor vehicle, and FIG. 2 is a schematic diagram showing an arrangement of a plurality of sensors in a fuel tank comprising a plurality of chambers according to another embodiment of the present invention.

DETAILED DESCRIPTION OF THE PRESENTLY PREFERRED EMBODIMENTS

Referring to FIG. 1, a motor vehicle 1 includes a fuel tank 2 with sensors 3, 3' made from magnetostrictive material according to the present invention. The sensors 3, 3' are fastened to the inner wall of the fuel tank 2. A transceiver unit 4 is arranged in the front part of the motor vehicle 1. The transceiver unit 4 produces an alternating magnetic field 5 at intervals of, for example, one second and thereby stimulates the sensors 3, 3' to oscillate and produce ultrasonic waves.

The frequency of the oscillations of the sensors 3, 3' is picked up by a receiver portion of the transceiver unit 4 and fed to an evaluation unit 6. The signal formed there is thereafter relayed to an evaluation unit 7 which displays the level to an operator of the motor vehicle 1.

FIG. 2 shows a further embodiment according to the present invention. In FIG. 2, a section of the fuel tank 2 is subdivided into two chambers 8, 8'. A delivery unit 9 for delivering the fuel to the engine of the motor vehicle is arranged in the chamber 8 and a suction jet pump 10 is arranged in the other chamber 8' for delivering the fuel from the chamber 8' into the splash pot of the delivery unit 9. A separate holder 11 is fastened on both built-in components 9, 10. Sensors 3a–d forming a measuring point are respectively located on each holder 11. All the sensors 3a–d differ in their dimensions such that the natural frequencies of one of the sensors 3a–d differs significantly from the others of the sensors 3a–d. To determine the level, the transceiver unit 4 produces an alternating magnetic field 5 with a frequency which corresponds to the natural frequency of the sensor 3a in air. The sensor 3a is thereupon set oscillating, while the sensors 3b–d execute virtually no oscillations at this frequency. The measured values of the oscillation are fed to the evaluation unit 6 which compares the measured values to a desired value of the sensor 3a on the basis of a corresponding signal from the transceiver unit 4. A first signal, which is buffered, is formed therefrom. Thereafter, the entire: operation is repeated, the alternating field 5 now having a frequency which corresponds to the natural frequency of the sensor 3b in air. An interrogation of the sensors 3c and 3d is then subsequently formed in the same manner. Finally, the first signals formed from the sensors 3a–d are used to form a second signal which then reflects the level in the fuel tank 2. Instead of the natural frequencies of the sensors in air, other frequencies may be used including the natural frequency of the sensor in the liquid. In addition to the level display in fuel tanks in motor vehicles, the invention also comprises, for example, all other liquid containers in which a level is measured. In this case, the method may also be applied in the case of liquid containers of simple shape when a plurality of sensors are used to determine different levels.

When the sensors 3a–d are used in liquid containers with aggressive media, the sensors 3a–d may comprise a protective coating 15 such as, for example, a film. The influence of the coating 15 on the oscillatory behavior of the sensors 3a–d must be taken into account when evaluating the measured oscillation values.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A level transmitter for a liquid container, comprising:
   a plurality of sensors comprising a magnetostrictive material arranged within a liquid container;
   a transceiver unit operatively arranged for transmitting an alternating magnetic field and receiving mechanical oscillations produced by the plurality of sensors in response to the alternating magnetic field, said transceiver unit being arranged outside of the liquid container; and
   an evaluation unit operatively connected to said transceiver unit and arranged for receiving the measured oscillating values from the transceiver unit, wherein a dimension of each of said plural sensors differs from the dimensions of the others of said plural sensors such that each of the plural sensors has its own characteristic oscillatory behavior.

2. The level transmitter of claim 1, further comprising a protective coating arranged on said plural sensors.

3. The level transmitter of claim 1, wherein said plural sensors are arranged on an inner wall of the liquid container via one of bonding and latching.

4. The level transmitter of claim 1, wherein the liquid container comprises a delivery unit and said plural sensors are arranged on the delivery unit.

5. The level transmitter of claim 1, wherein said plural sensors are arranged in a vertical alignment one above the other above a location on the bottom of the liquid container.

6. The level transmitter of claim 1, wherein said plural sensors comprise subsets of said plural sensors arranged at several measuring points in the liquid container, wherein each subset includes plural sensors arranged in a vertical alignment.

7. The level transmitter of claim 1, wherein said transceiver unit is arranged separately in space relative to the plural sensors.

8. A method for determining a level in a liquid container with a level transmitter comprising a plurality of sensors comprising a magnetostrictive material arranged within a liquid container, a transceiver unit operatively arranged for transmitting an alternating magnetic field and receiving mechanical oscillations produced by the plurality of sensors in response to the alternating magnetic field, said transceiver unit being arranged outside of the liquid container, and an evaluation unit operatively connected to said transceiver unit and arranged for receiving the measured oscillation values from the transceiver unit, wherein a dimension of each of said plural sensors differs from the dimensions of the others of said plural sensors such that each of the plural sensors has its own characteristic oscillatory behavior, wherein said method comprises the steps of:
   (a) applying an alternating magnetic field to the sensors with the transceiver unit and varying the alternating magnetic field such that the alternating magnetic field is adapted successively to the oscillatory behavior of each of the plural sensors;
   (b) detecting oscillations produced in said step (a) at the transceiver and feeding the detected oscillation values to the evaluation unit;
   (c) assigning each of the detected oscillation values to a specific one of the plural sensors and forming a first signal for the level of the specific one of the plural sensors; and
   (d) forming a second signal for the level in the liquid container from the first signals of the plural sensors formed in said step (c).

9. The method of claim 8, wherein said step (a) comprises producing the alternating magnetic field outside the liquid container.

10. The method of claim 8, wherein said step (a) further comprises selecting a frequency of the alternating magnetic field as the natural frequency of the one of the plural sensors.

11. The method of claim 8, wherein said step (a) comprises selecting a frequency range for the alternating magnetic field in which the natural frequency of the one of the plural sensors is situated, and traversing the frequency range in periodic intervals.

12. The method of claim 8, wherein said step (a) comprises selecting the frequency of the alternating magnetic field at a natural frequency of the sensor in air.

13. The method of claim 8, wherein said step (a) comprises selecting the frequency of the alternating magnetic field at a natural frequency of the sensor in the liquid.

14. The method of claim 8, wherein said step (c) comprises forming a level of the first signal in response to one of a frequency, an amplitude and a decay time of the detected oscillation value of the one of the plural sensors.

15. The method of claim 8, wherein said step (a) comprises selecting a frequency of the alternating magnetic field from a range including 20 to 100 kilohertz.

16. The method of claim 8, further comprising the step of repeating steps (a)–(d) at periodic intervals.

17. The method of claim 16, wherein the periodic intervals are selected from a range including one millisecond to ten minutes.

18. The method of claim 8, further comprising the step of averaging the second signals formed in said step (d) over time to produce a means value and using the means value as a signal for the level.

* * * * *